US008306326B2

(12) United States Patent
Behm et al.

(10) Patent No.: US 8,306,326 B2
(45) Date of Patent: Nov. 6, 2012

(54) METHOD AND SYSTEM FOR AUTOMATICALLY CLASSIFYING PAGE IMAGES

(75) Inventors: Bradley Jeffery Behm, Seattle, WA (US); Brent Eric Wood, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1341 days.

(21) Appl. No.: 11/513,444

(22) Filed: Aug. 30, 2006

(65) Prior Publication Data

US 2008/0056575 A1  Mar. 6, 2008

(51) Int. Cl.
*G06K 9/34* (2006.01)
(52) U.S. Cl. ....... 382/176; 382/180; 382/305; 358/1.15; 704/9
(58) Field of Classification Search .................. 382/176, 382/180, 305; 358/1.15; 704/9
See application file for complete search history.

(56) References Cited

U.S. PATENT DOCUMENTS

| | | | | |
|---|---|---|---|---|
| 5,208,905 A * | 5/1993 | Takakura et al. | ............ | 715/219 |
| 5,909,680 A | 6/1999 | Hull | | |
| 6,591,076 B2 * | 7/2003 | Connors | ...................... | 399/194 |
| 6,675,159 B1 * | 1/2004 | Lin et al. | .............................. | 1/1 |
| 2001/0042085 A1 | 11/2001 | Peairs | | |
| 2005/0080613 A1 * | 4/2005 | Colledge et al. | .................. | 704/9 |
| 2005/0235030 A1 * | 10/2005 | Lauckhart et al. | ............ | 709/200 |
| 2007/0214263 A1 * | 9/2007 | Fraisse et al. | ................ | 709/225 |

FOREIGN PATENT DOCUMENTS

| WO | 02056197 A1 | 7/2002 |
|---|---|---|
| WO | WO 2005/038670 | * 4/2005 |

OTHER PUBLICATIONS

Yip, S.K., and Z. Chi, "Page Segmentation and Content Classification for Automatic Document Image Processing," Proceedings of 2001 International Symposium on Intelligent Multimedia, Video and Speech Processing, Hong Kong, May 2-4, 2001, pp. 279-282.

* cited by examiner

*Primary Examiner* — Jingge Wu
*Assistant Examiner* — Eueng-Nan Yeh
(74) *Attorney, Agent, or Firm* — Knobbe Martens Olson & Bear LLP

(57) ABSTRACT

A system and method are disclosed for automatically classifying images of pages of a source, such as a book, into classifications such as front cover, copyright page, table of contents, text, index, etc. In one embodiment, three phases are provided in the classification process. During a first phase of the classification process, a first classifier may be used to determine a preliminary classification of a page image based on single-page criteria. During a second phase of the classification process, a second classifier may be used to determine a final classification for the page image based on multiple-page and/or global criteria. During an optional third phase of classification, a verifier may be used to verify the final classification of the page image based on verification criteria. If automatic classification fails, the page image may be passed on to a human operator for manual classification.

20 Claims, 11 Drawing Sheets

METHOD AND SYSTEM FOR AUTOMATICALLY CLASSIFYING PAGE IMAGES

FIELD OF THE INVENTION

The present invention is directed to systems and methods that provide classification of images of pages of content.

BACKGROUND

The information age has produced an explosion of content for people to read. This content is obtained from traditional sources such as books, magazines, newspapers, newsletters, manuals, guides, references, articles, reports, documents, etc., that exist in print, as well as electronic media in which the aforesaid sources are provided in digital form. The Internet has further enabled an even wider publication of content in digital form, such as portable document files and e-books.

Technological advances in digital imaging devices have enabled the conversion of content from printed sources to digital form. For example, digital imaging systems including scanners equipped with automatic document feeders or scanning robots are now available that obtain digital images of pages of printed content and translate the images into computer-readable text using character recognition techniques. These "page images" may then be stored in a computing device and disseminated to users. Page images may also be provided from other sources, such as electronic files, including electronic files in .pdf format (Portable Document Format).

When a user attempts to access images of one or more pages of content from a book or other source stored on a computing device, it may be desirable to facilitate such access based on the type or classification of the page represented by the image, thus enhancing the user experience. For example, rather than forcing the user to reach a certain portion of the content by accessing the content serially, page image by page image, direct links may be provided, for example, to a page image classified as a table of contents or the start of the text.

Currently, classification of page matter is done manually, which is time consuming and costly. Accordingly, a method and system are needed for automatically classifying images of pages of content.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with embodiments of the invention, a system is provided for automatically classifying page images of a source, such as a book, into classifications such as front cover, copyright page, table of contents, text, index, etc. For example, a system is disclosed that includes a database for storing criteria related to content of a source, and a classifier that automatically classifies an image of a page of content from the source based on the criteria stored in the database. The criteria may be related to the content of the page whose image is being classified by the classifier, and/or the criteria may be related to the content of the source as a whole. Moreover, the criteria include dynamic information based on a priori knowledge and/or the criteria may include static information that is predetermined. The system may optionally include a verifier that verifies the classification of the image of the page provided by the classifier. However, if the classifier is unable to classify the image of the page, or if the verifier is unable to verify the classification produced by the classifier, the image of the page may be classified manually.

Methods and a computer-readable medium having instructions encoded thereon for classifying page images generally consistent with the system described above are also disclosed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Before page images of a book or other source of content are made available electronically, it may be desirable to classify different page images of the source according to the type of content included therein. For example, page images of a book may be classified as "cover," "copyright page," "table of contents," "text," "index," etc. In some embodiments, such classification may be used to link users directly to images of pages of a certain type, e.g., a table of contents. In yet other embodiments, such classification may be used to exclude a certain page image such as an image of the cover page, from access. Moreover, by excluding images of non-copyrighted pages, e.g., blank pages, the user may be granted access to more images of copyrighted pages under the fair use doctrine, which allows only a certain ratio of the content to be accessed if the user does not own the copy of the content being accessed.

Currently, page images are classified manually by human operators. This is a time consuming and expensive process. To reduce the cost and time of page image classification, a system and method are disclosed for automatically classifying page images. The classifications may include, but are not limited to, front cover, front face (typically, a black and white cover just inside the book), front matter (typically including reviews, blank pages, introduction, preface, dedication, etc.), copyright page, table of contents, text (typically including the main body of the book or source, but excluding introduction, preface, etc.), index, back matter (reviews, order forms, etc.), and back cover. Those skilled in the art will recognize page images may be classified into any category or type deemed suitable for purposes of the system or based on the source, e.g., book, magazine, journal, etc.

In one embodiment, three phases are provided in the classification process. During a first phase of the classification process, a first classifier may be used to determine a preliminary classification of a page image based on single-page criteria. During a second phase of the classification process, a second classifier may be used to determine a final classification for the page image based on multiple-page and/or global criteria. During an optional third phase of classification, a verifier may be used to verify the final classification of the page image based on verification criteria. During each phase, the classification process may be repeated on the same page image if the probability that the page image has the determined classification falls short of a desired probability threshold. Furthermore, if a classification phase is repeated on the same page image a number of times which exceeds a desired repetition threshold, the page image may be passed on to a human operator for final classification.

Figure 1:
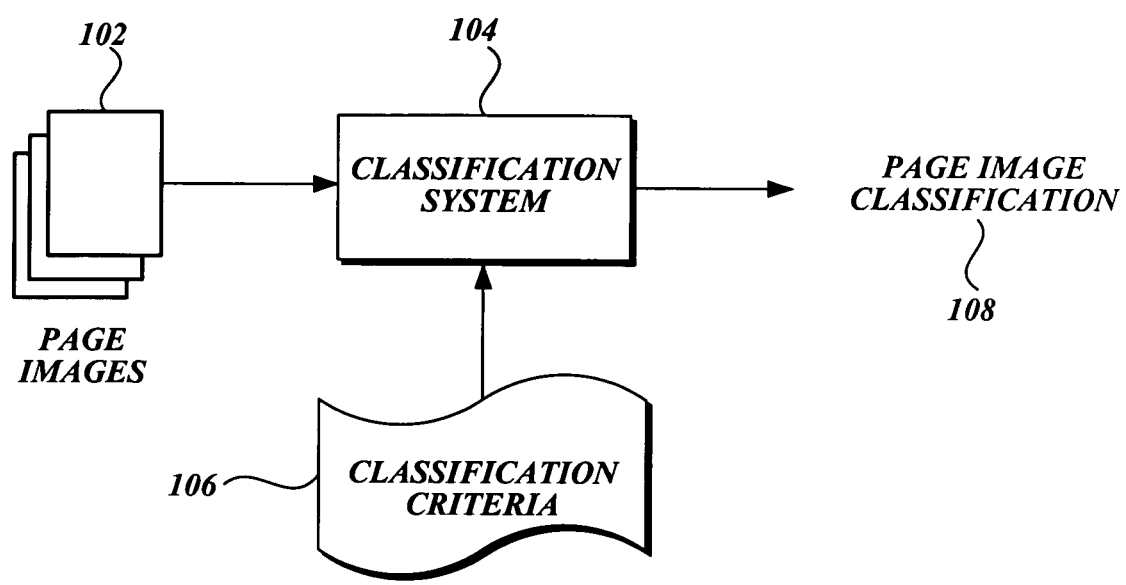
FIG. 1 is a block diagram depicting a sample embodiment of a page image classification system formed in accordance with the present invention.

FIG. 1 is a block diagram showing one embodiment of a page image classification system. Generally, sorted page images of a book or other source are collected and stored. Each page image is classified based on classification criteria. The classification for each page is stored for future use, e.g., during access or publishing of the book or source. In the illustrated embodiment, digitized page data from page images 102 are input to a classification system 104. The classification system 104 uses classification criteria 106 to classify each page image 102. Each page image classification 108 is recorded for further analysis or use.

Figure 2:
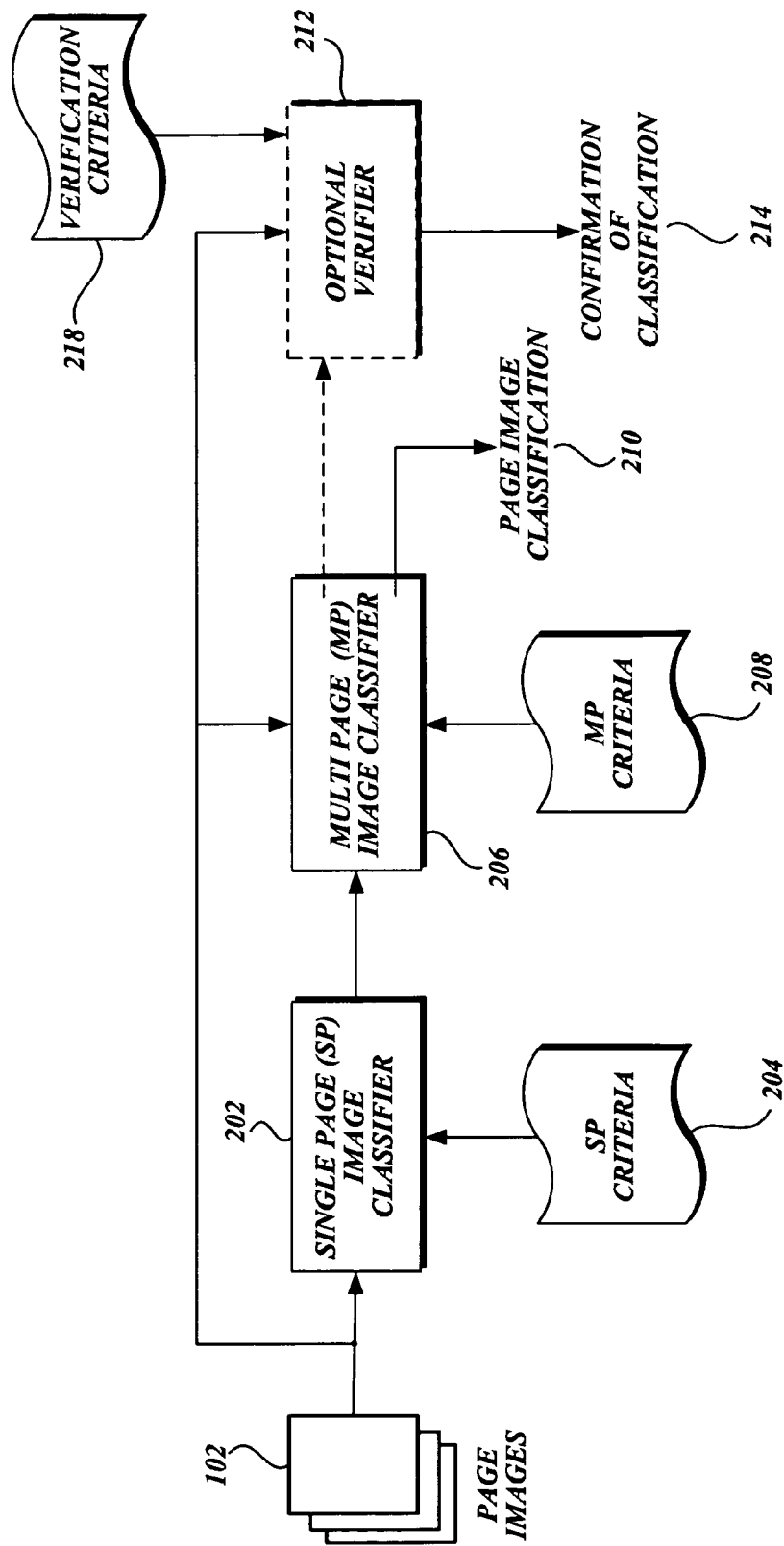
FIG. 2 is a block diagram depicting sample modules of the classification system shown in FIG. 1.

As briefly noted above, the classification system 104 may implement multiple phases of page image classification. For example, in one embodiment, a preliminary page image classification is determined in a first phase, a final page image classification is determined in a second phase, and the final classification is verified in an optional third or "verification" phase. An embodiment of the classification system for implementing the first, second, and third phases is shown in FIG. 2. In the illustrated embodiment, digitized page data from page images 102 are input to a single-page (SP) image classifier 202. The SP classifier 202 is used to assign a preliminary classification to each page image. In one embodiment, the single-page image classifier 202 is a linear combinator classifier, described in more detail below with respect to FIG. 7. In another embodiment, the single-page image classifier is a Bayesian classifier, which is well known in the art as a probability based method for classifying the outcome of an experiment. Those skilled in the art will recognize that various types and/or combinations of classifiers may be used without departing from the scope of the present disclosure. The single-page image classifier 202 is so named, not because of the type of classifier used but because of the type of criteria used to classify the page images 102. More specifically, the single-page image classifier 202 uses single-page (SP) criteria 204 which are based solely on the content of the page image being classified. SP image classifier 202 produces a preliminary classification for each page image 102.

As further shown in FIG. 2, the multi-page (MP) classifier 206 receives the digitized page data from page images 102, the preliminary classification for each page image provided by SP classifier 202, and multi-page (MP) criteria 208. Similar to SP image classifier 202, the MP image classifier 206 is so named because of the criteria it uses, namely, multi-page criteria. The MP criteria 208 are based on information relating to the whole source including the source's structure, subject matter, numeral and word densities, etc. Those skilled in the art will recognize that fewer, more, or different criteria may be used, based on the classifier, source, or other design considerations. The MP classifier 206 uses the above-mentioned received information to assign a final page image classification 210 for each page image. Although the SP classifier 202 and the MP classifier 206 are illustrated as separate modules in FIG. 2, in yet another embodiment, the MP image classifier 206 and the SP image classifier 202 are implemented as a single module that uses the MP criteria 208 and SP criteria 204, respectively, to perform their respective functions.

Figure 5:
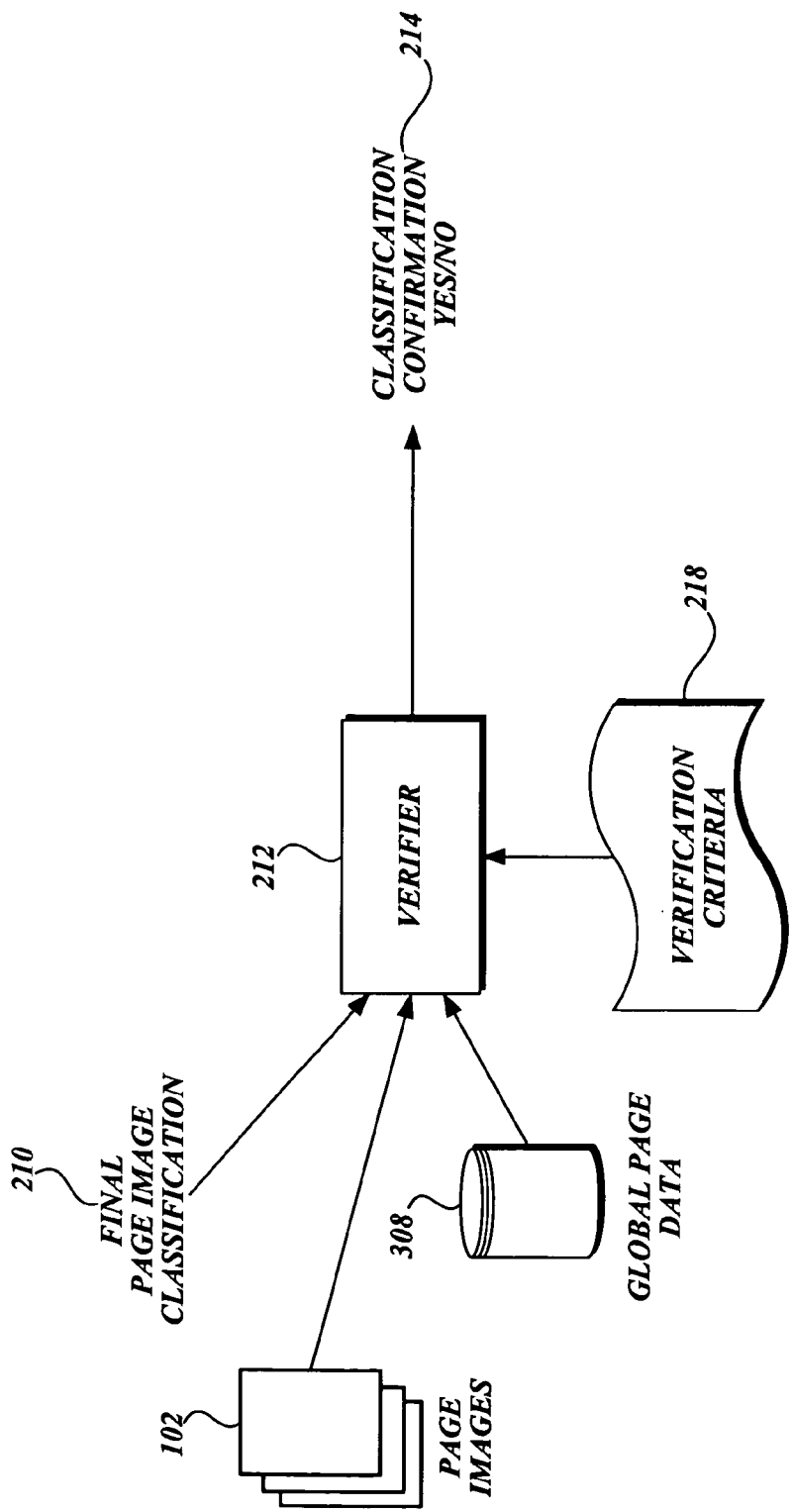
FIG. 5 is a block diagram depicting a sample optional verification module that may be used in conjunction with a classification module.

In another embodiment, the final page image classifications 210, digitized page data, and verification criteria 218 (described more fully below with respect to FIG. 5) are received and used by an optional verifier 212 to confirm the final classification 210. The verifier 212 applies the verification criteria 218 to each page image classification to verify the correctness of the classification and issue a confirmation of the classification 214. In one embodiment if the verifier 212 rejects the final page image classification of a page image, the page image is passed on to a human operator to make a final determination of the page image classification.

The classification criteria embodied in the SP criteria 204 and the MP criteria 208 include features and information organized along two conceptual axes: a single page-to-aggregate axis and a static-dynamic axis. The single page-to-aggregate axis includes information that spans a single page image, independent of other page images, to aggregate information obtained from the source as a whole. For example, a keyword such as "CONTENTS" appearing in a page image is single-page information and is independent of information in other page images. Whereas, location of a page image in a source (for example, being in the first half or second half of a book) provides information that depends on aggregate information obtained from other page images or the source as a whole (for example, total number of page images in the book).

The static-dynamic axis includes information spanning static information or keywords that are pre-determined as classification features, such as "CONTENTS," "INDEX," "CHAPTER," etc., to dynamic information or keywords that are obtained during the classification of page images in the SP classification phase. For example, the name of the author of a book may be extracted from the image of a cover page and subsequently be used as a feature in classifying other page images, such as the image of an acknowledgment page. A feature generally includes information from both of these axes. A feature may include dynamic information and be related to a single page image, while another feature may include dynamic information and be related to aggregate information. For example, as discussed above, the name of the author is a dynamic keyword feature, which is related to a single page image, independent of other page images. An example of a dynamic keyword related to aggregate information is a topic extracted from a table of contents which can later be used to differentiate other parts of the book, such as the foreword (front matter) and Chapter 1 (text).

Figure 3:
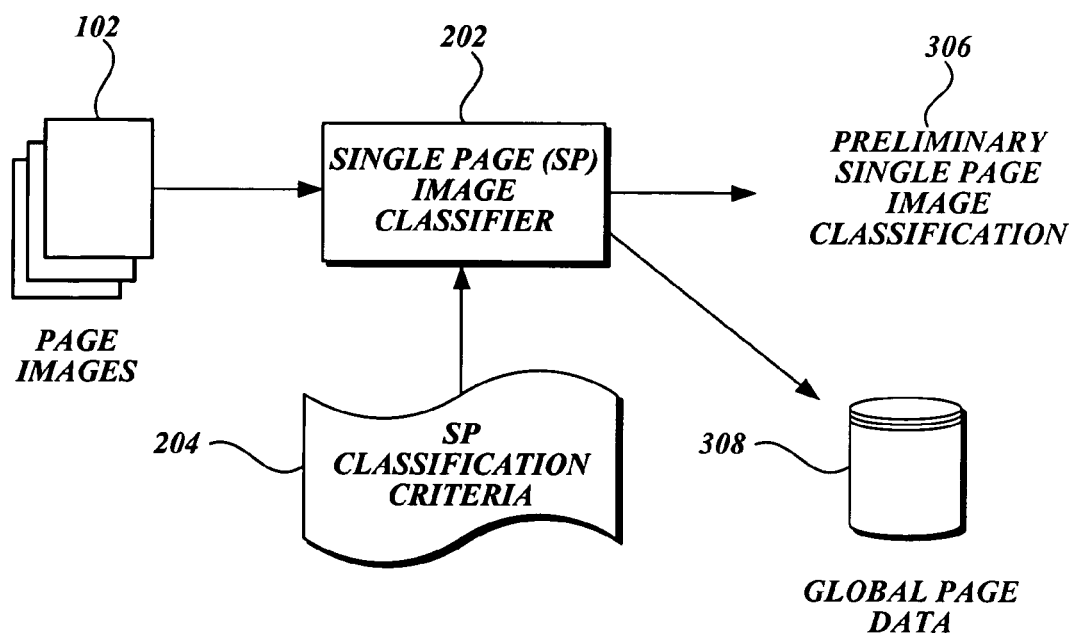
FIG. 3 is a block diagram depicting a sample single-page image classification module.

FIG. 3 is a block diagram depicting a sample single-page image classification module in more detail. As noted above with respect to FIG. 2, the SP image classifier 202 receives digitized page data from the page images 102 and uses the SP criteria 204 to assign a preliminary classification to each page image. In one embodiment, the SP criteria 204 include, but are not limited to, static keywords, dynamic keywords, images, and font variety. Those skilled in the art will recognize that fewer, more, or different criteria may be used, based on the classifier, source, or other design considerations. Static keywords are predetermined keywords such as "CONTENTS," "INDEX," etc., which indicate a possible classification for the page image in which they are found. For example, the static keyword "CONTENTS" found in a page image increases the likelihood that the image is of a page including a table of contents. Other features may contribute to make the determination about the classification of the page image. For example, if the static keyword "CONTENTS" is preceded by the words "TABLE OF" and is in all capital letters, then the likelihood that the image is of a page including a table of contents is further increased.

Dynamic keywords are features which may be based on a priori or deductive knowledge. For example, "ISBN" is a known identifier for published books. However, each ISBN is followed by a number in a special format that is the value of the ISBN. The ISBN number must appear on the copyright page. Therefore, if the ISBN keyword and number appear in a page image, then the page image may be classified as the copyright page. In one embodiment, dynamic keywords may be created based on a catalog database. Another example of a dynamic keyword is the author's name, as discussed above.

Images are another feature that may be used as a criterion for the classification of single page images. For example, an image of a page that has a large surface area covered by images is more likely to be the page image of a front or back cover page. Single smaller images are often indicative of drop-caps (the enlarged first letter of a paragraph, usually found at the beginning of a chapter), which may be used to find chapter beginnings and thus, the start of the body text. As yet another example of a dynamic feature, images of pages that include a variety of fonts and sizes are more likely to be images of non-body pages. For example, the table of contents may have roman numerals, larger and bold fonts for major topics and smaller fonts for sub-topics.

As mentioned above, the SP image classifier 202 applies the SP criteria 204 to the digitized page data obtained from the page images 102 and assigns a preliminary classification 306 to each page image. Additionally, the SP image classifier 202 may collect global page data 308 as each page is processed. In one embodiment, the global page data 308 are stored in a database to be later combined with MP criteria 208 and used for multi-page classification. In another embodiment, the global page data 308 may be integrated with the MP criteria 208, forming MP features. Phase one of the classification process is thus completed by the SP image classifier 202. Phase two of the classification process is performed by the MP classifier 206 using the output of phase one from the SP classifier 202.

Figure 4:
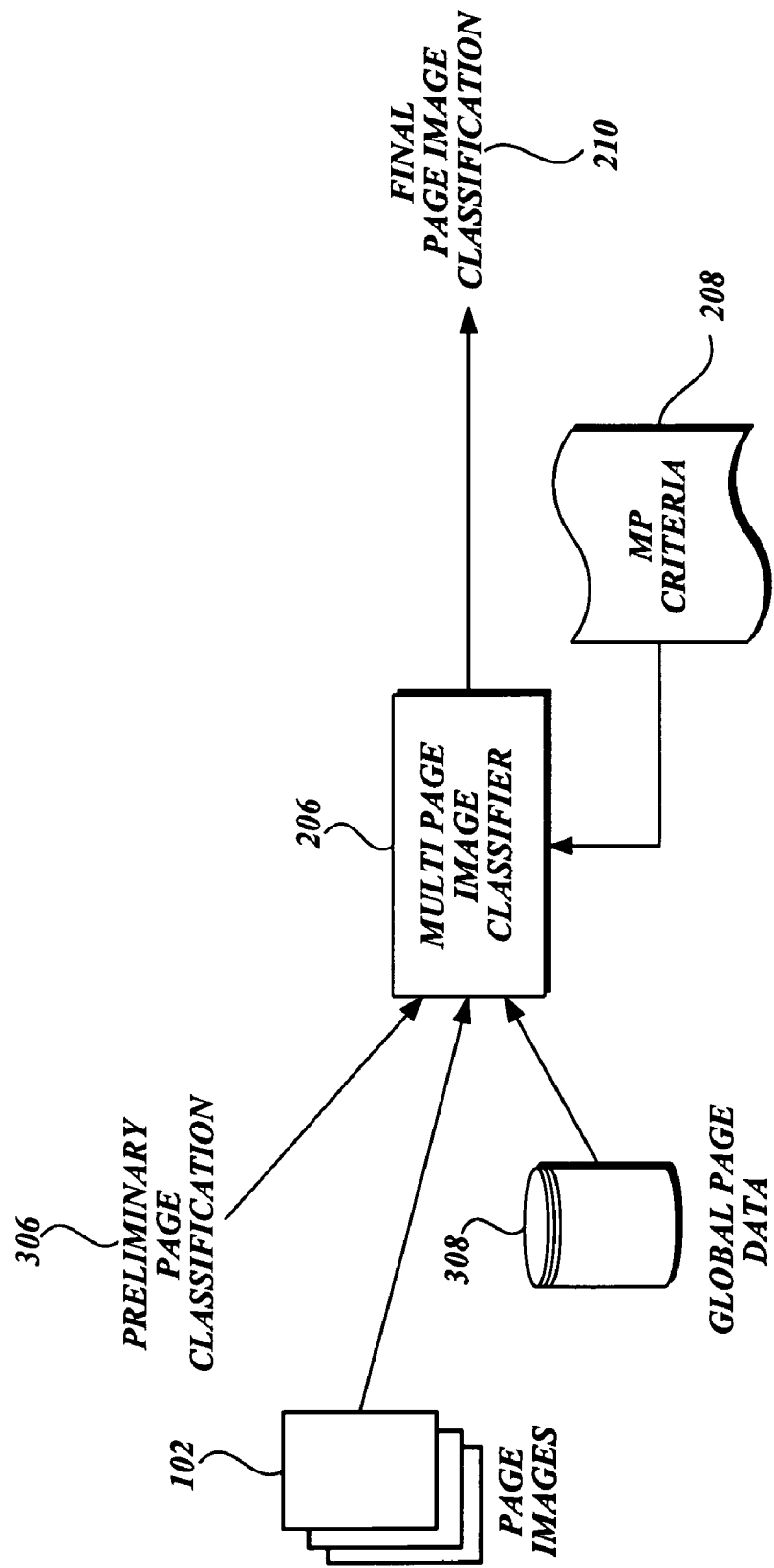
FIG. 4 is a block diagram depicting a sample multiple-page image classification module.

FIG. 4 is a block diagram depicting a sample multiple-page image classification module in more detail. The MP image classifier 206 receives a preliminary page classification 306, digitized page data from the page images 102, and the global page data 308. The MP image classifier 206 combines this information with the MP criteria 208 and applies this combination to each page image to assign a final page image classification 210 to each page image. The global page data 308 includes aggregate information collected from all the page images in the source as a whole. In one embodiment, the MP criteria 208 include dynamic and/or static information. Non-limiting examples include page image location information, title keywords, sentence structure, previous page, digit density, and word density. Those skilled in the art will recognize that fewer, more, or different criteria may be used, based on the classifier, source, or other design considerations. In one embodiment, the page image location information is used to determine page image classification by excluding other possible classifications. For example, images of pages in the front portion of a book may not be classified as back matter. The front portion of a book may be specified with respect to the total size of the book, and is thus considered a feature including aggregate information. For example, some predetermined percentage, such as ten percent, of the total pages of a book may be considered the front portion of the book and any page included in the front portion may not be classified as back matter, helping to narrow down the possible classifications of the page images.

As noted above, dynamic keywords may be related to aggregate information. In one embodiment, the dynamic keywords are extracted from each page image during the first phase of classification by the SP image classifier 202. For example, the table of contents may be parsed and dynamic keywords may be extracted and saved as part of the global page data 308. As noted above, dynamic keywords may be used to differentiate different types of pages, such as the foreword and Chapter 1.

Title keywords may be identified based on global page data 308 including information about average font sizes throughout the source. In one embodiment, words with larger than average font sizes may be considered as title keywords. In other embodiments, other or additional rules may be used to identify title keywords. Once identified, the title keywords may subsequently be used to identify beginnings of chapters and sections in other page images.

Sentence structure is another dynamic feature including aggregate information. Sentence structure may be used to identify an image of the beginning of a new page or chapter. For example, the presence of a capitalized word after a period on a previous page image may indicate that a new page starts with a new sentence. In one embodiment, a grammar-based engine may be used to parse sentences and determine what type of page would contain the parsed sentence.

Previous page is a dynamic feature which includes aggregate information. In one embodiment, the classification for a page image may be determined based on the classification of an image as a previous page. For example, a page image with a text classification most likely follows another page image with the same classification. In another embodiment, a table of observed probabilities may be constructed to provide the probability that a page image has a certain classification if it follows another page image with the same or a different classification. Such a table may indicate that, for example, a page image with the classification of table of contents follows a page image with the classification of front matter 25% of the time, and a page image with the classification of front cover follows any other page image zero percent of the time.

Digit density is another feature which includes aggregate information. Digit density is a statistical description of the numeral density distribution throughout a source. The digit density feature may be used to identify certain page images as having a particular classification or exclude other page images from the same. For example, page images with higher than average digit density are more likely to have a classification of table of contents or index.

Word density is a feature that is similar to digit density, but indicates the likelihood of a page image having a different classification than indicated by the digit density feature. For example, page images with lower than average word density are less likely to have a classification of text (body text). A graph of word density versus page number, such as a histogram, may show sharp changes in word density at images of certain pages, indicating the beginning or end of a group of page images having a certain type of page classification. For example, a sharp increase in word density may indicate a transition from page images having a table of contents classification to page images with a text classification.

Referring to FIG. 2, the MP image classifier 206 may provide an optional verifier 212 with the final page image classifications 210 for confirmation. As shown in more detail in FIG. 5, the optional verifier 212 may use the final page image classification 210, the digitized data from the page images 102, the global page data 308, and additional verification criteria 218 to verify the final page image classification 210 assigned by the MP classifier 206. In some embodiments, the verifier 212 may also use the preliminary page image classification 306 to assist in verification. In one embodiment, the verification criteria 218 are a combination of the SP criteria 204 and the MP criteria 208. In another embodiment, the verification criteria 218 are a subset of the SP criteria 204 and the MP criteria 208. In yet another embodiment, the verification criteria 218 may include features not used in either the SP criteria 204 or the MP criteria 208. In yet another embodiment, the verification criteria 218 include features that are computationally inexpensive to perform on each page. Such features are used only as a check on the classification determinations made by the SP classifier 202 and the MP classifier 206. For example, the verifier 212 may use a verification feature to ensure that the page image classified as the back cover is an image of the last page of a book. Such verification is computationally less expensive than verification using other features such as word density discussed above. In yet another embodiment, the optional verifier 212 may be used to implement human-understandable criteria for the classification. Many of the criteria used by the SP classifier 202 and MP classifier 206 are based on statistical methods which may not be intuitively clear. For example, word density and digit density are inherently statistical criteria, which may not directly indicate a particular page image classification to a human. The verifier 212 may use verification criteria 218 that are intuitively more clear. For example, one verification criterion may include the fact that the front cover page image cannot appear after the table of content page image. This criterion is intuitively more clear to a human. Such criteria increase human confidence in the classification of the page image.

The verifier 212 provides a page image classification confirmation 214, either confirming or rejecting the final classification 210. Although depicted separately in FIG. 5, in another embodiment, the verifier 212, the MP classifier 206, and the SP classifier 202 are implemented as a single module that uses the verification criteria 218, the MP criteria 208, and the SP criteria 204, respectively, to perform their respective functions.

Figure 6:
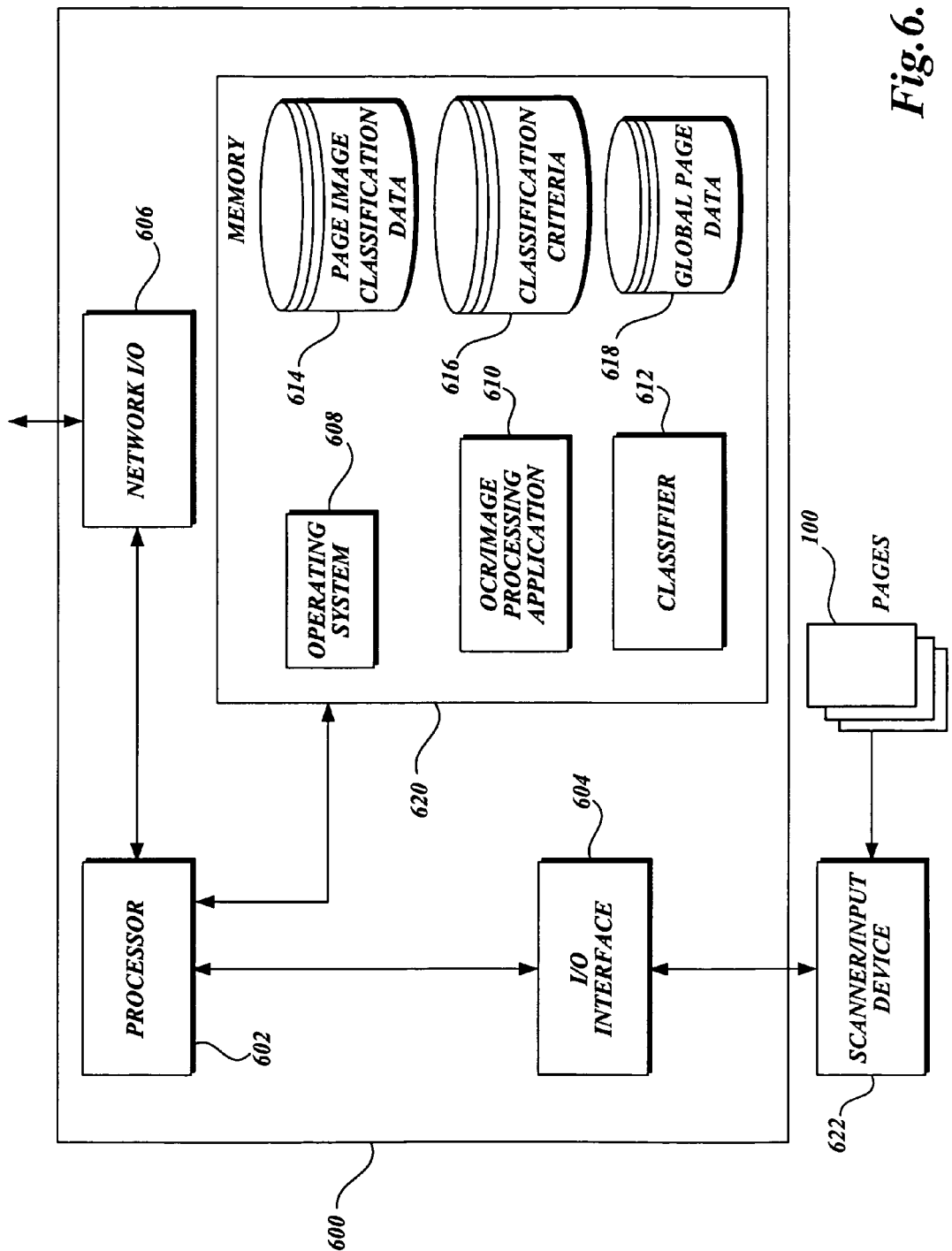
FIG. 6 is a block diagram depicting a sample computing environment for implementing the classification system shown in FIG. 1.

FIG. 6 is a block diagram depicting a sample computing environment for the implementation of the embodiment of the classification system shown in FIG. 1. In this sample computing environment, a classifier 612 (which may include an SP image classifier 202, an MP image classifier 206, and/or the verifier 212) is provided in memory 620 that uses the various classification criteria 616, the page image classification data 614, and the global page data 618, depending on the phase of the classification. An OCR application module 610 may be used to digitize the data obtained from scanned pages 100 and provide the extracted information to the classifier 612. The extracted information may include page numbers, computer-encoded text (e.g., ASCII characters), and images labeled as non-text data, such as pictures. The classification criteria may include the SP criteria 204, the MP criteria 208, and/or the verification criteria 218. Each set of criteria is used during the respective phase of classification as described above with respect to FIGS. 2-4. In one embodiment, the page images 102 are obtained by using a scanning device 622 to scan pages 100 of a source. The resultant data is provided to processor 602 via the input/output (I/O) interface module 604. In another embodiment, pages 100 of a source are pre-scanned and the resultant page images are stored in a remote database. In this embodiment the page images are provided to the classification system 600 via a network interface 606. In yet another embodiment, page images may be provided as electronic documents or files, such as files in .pdf format.

Figure 7:
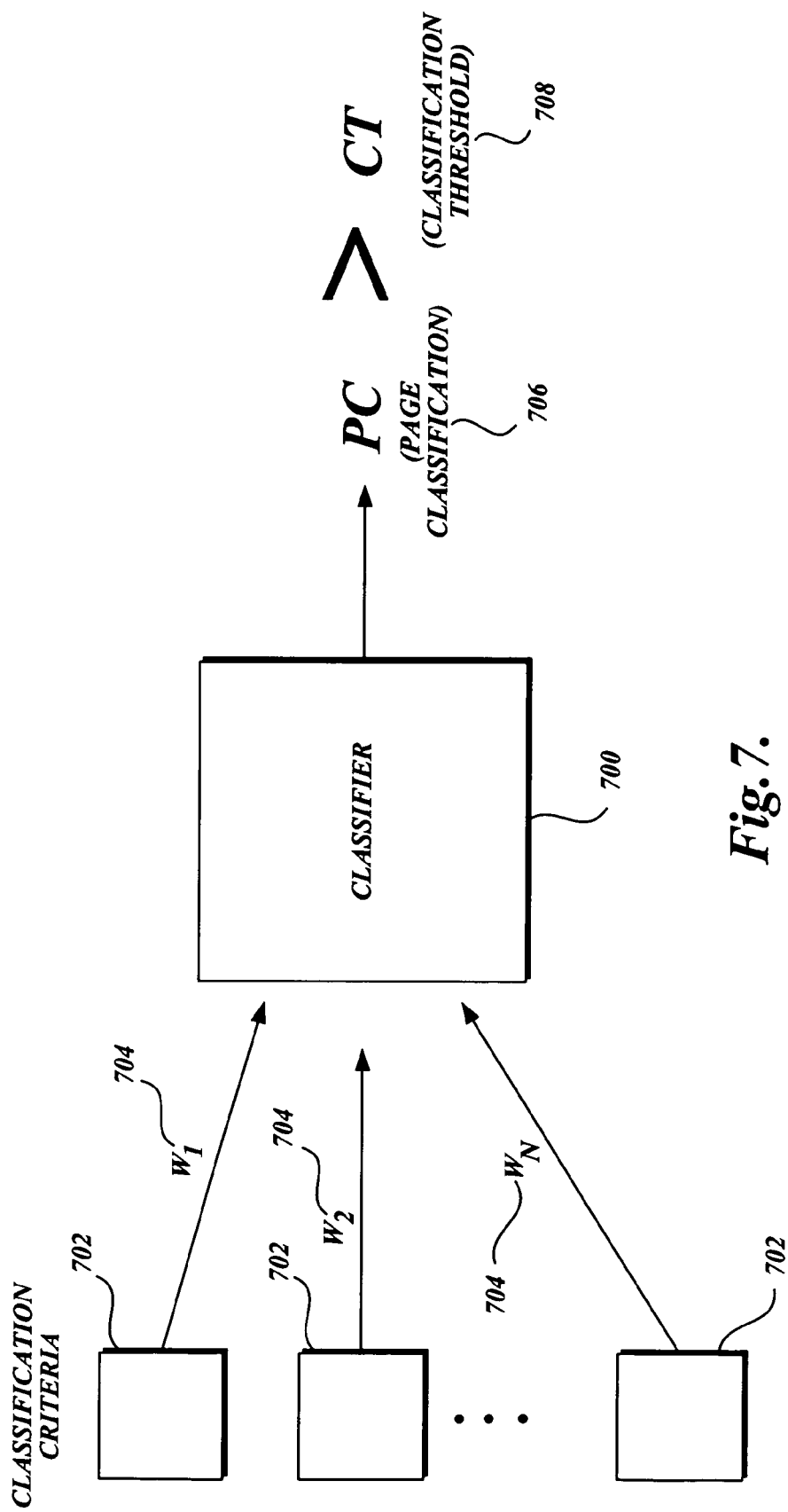
FIG. 7 is a block diagram of a sample linear combinator classifier.

Now that sample classification modules and an operating environment therefor have been described, the operation of a classifier, such as an SP image classifier, will be described in more detail. As mentioned above, a classifier 700 may be a linear combinator that combines classification criteria to produce a page image classification score 706, as depicted in FIG. 7. The classifier 700 applies classification criteria 702 (such as SP criteria) for one classification and to one page image at a time to determine whether that page image fits that particular classification. For each page image and each classification, if the page image classification score 706 is less than a classification threshold value 708, the page image classification for that page image is rejected and a new classification for that page image is tried. This process continues until either a classification is found for the page image or no classification is found for the page image. If no classification is found for the page image, the process may be repeated a certain number of times for each page image using new data for the page image. If after a predetermined number of repeated attempts no classification is found, the page image may be referred to a human operator to manually assign a classification for the page image. In one embodiment, classification criteria 702 are linearly combined using weighted coefficients 704. The weighted coefficients 704 may be probabilities associated with the respective classification criteria 702, indicating the probability that the respective classification criterion 702 correctly identifies the page image being classified by the classifier 700 as having the page image classification being presently considered. Therefore, for each potential page image classification presently being considered by the classifier 700, a different linear combination of criteria 702 and weighted coefficients 704 may be used.

Figure 8:
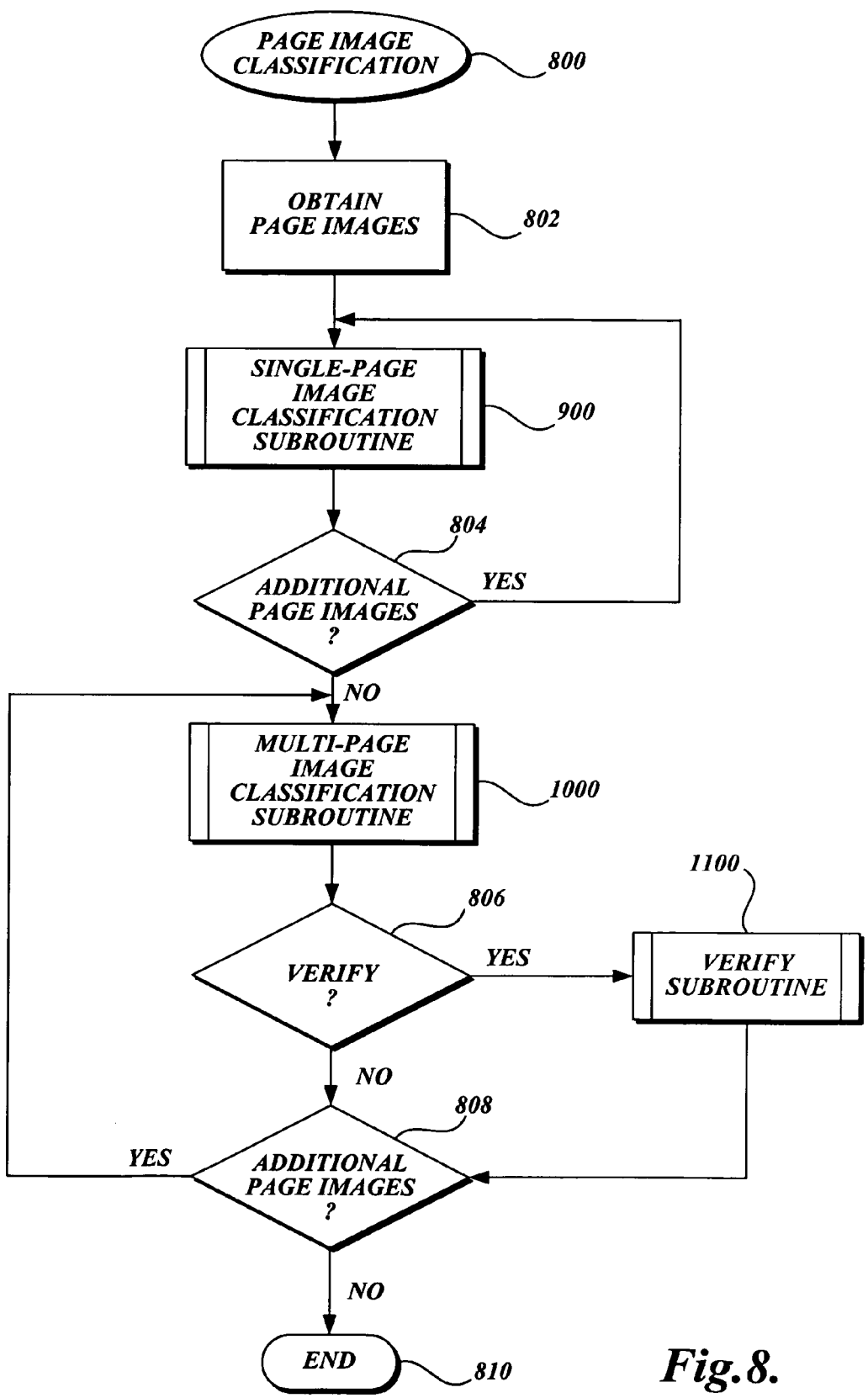
FIG. 8 is a flow diagram showing a sample method for page image classification.

As noted above with respect to FIG. 2, the classification process may include a single-page image classification phase, a multi-page classification phase, and an additional optional verification phase. FIG. 8 is a flow diagram showing a sample method for such classification. The routine 800 obtains digitized data from the page images 102 in block 802. Next, in subroutine 900, an SP image classification is performed. As noted above with respect to FIG. 3, the SP image classification is performed based on SP criteria 204 that include features that are entirely based on information contained in a single page image being classified. In decision block 804, the routine 800 determines whether additional page images remain to be classified in the document. If there are additional page images remaining, the routine 800 returns to subroutine 900 wherein the additional page image is classified by the SP image classifier 202. If no more page images remain, the routine 800 proceeds to subroutine in 1000 wherein an MP image classifier 206 classifies the page image using MP criteria 208. As noted above with respect to FIG. 4, the MP criteria 208 are based, at least in part, on aggregate global page information 308 created and provided by the SP image classifier 202 in subroutine 900. When the page image is classified by the MP image classification subroutine in block 1000, the routine 800 determines whether the classified page image is to be verified in a decision block 806. If the classified page image is to be verified, the routine 800 proceeds to subroutine 1100 whereby the classification of the classified page image is verified. The routine proceeds to decision block 808 whereby the routine 800 determines whether additional page images remain to be classified by the MP image classification routine 1000. Back in decision block 806, if no verification is required, the routine 800 proceeds to block 808. If additional page images remain to be classified, the routine 800 returns to subroutine 1000 to classify the additional page image. If no additional page images remain, the routine 800 terminates at block 810. The routine 800 describes the overall classification method including the optional verification phase. Each phase is examined in more detail below.

Figure 9:
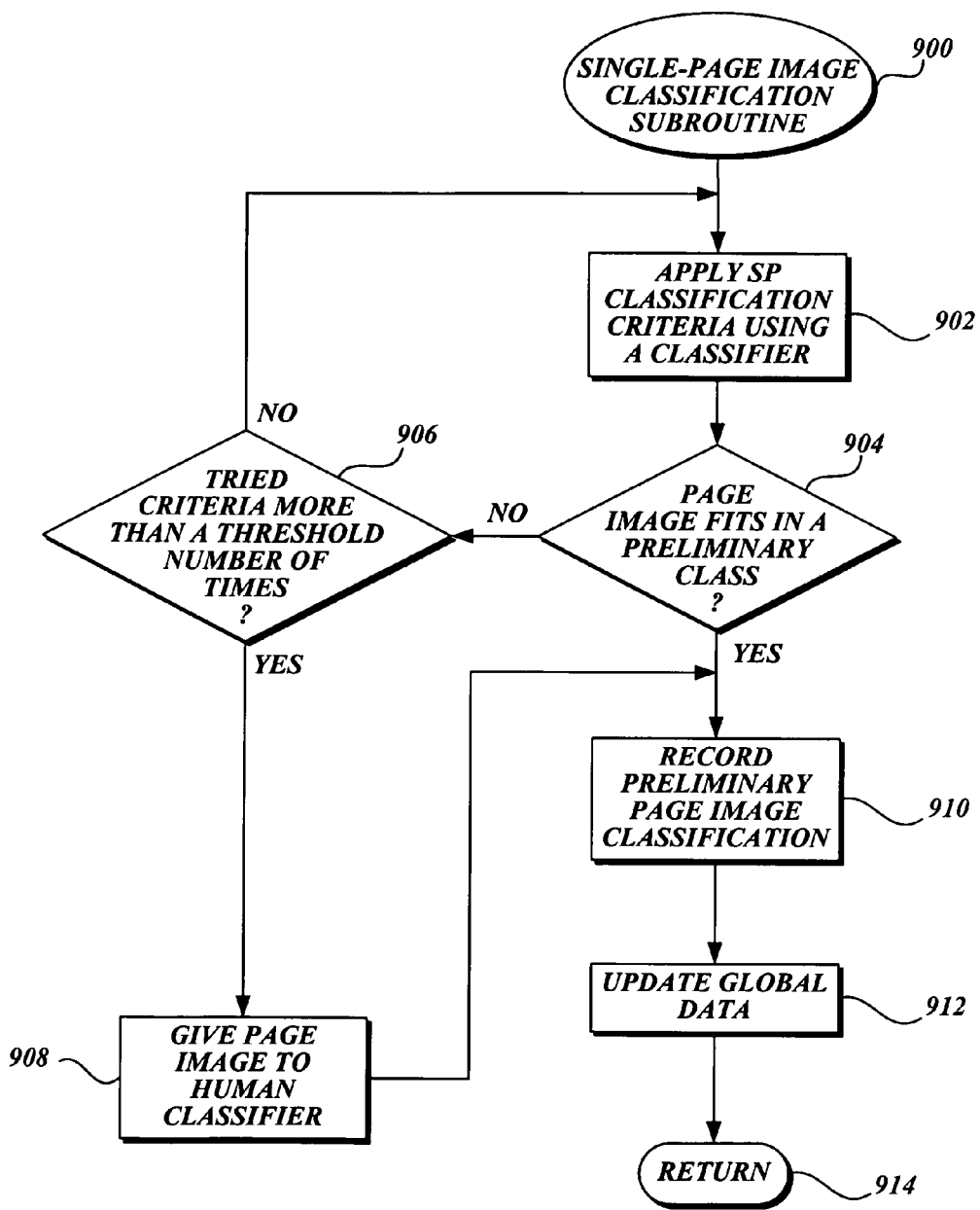
FIG. 9 is a flow diagram showing a sample method for single-page image classification referenced in the flow diagram of FIG. 8.

FIG. 9 is a flow diagram showing a sample method for single-page image classification referenced in the flow diagram of FIG. 8. As noted above with respect to FIG. 3, subroutine 900 classifies a given page image using SP criteria 204. Subroutine 900 implements a first phase of the classification process depicted in FIG. 8. In one embodiment, the SP criteria 204 include, but are not limited to, static keywords, dynamic keywords, images, and font variety. The criteria may be applied to one page at a time and for one classification at a time, as noted above. Subroutine 900 may use a linear combinator classifier or other classifiers, such as a Bayesian classifier, to apply the SP criteria 204 in block 902. The subroutine 900 applies the SP criteria 204 for different page image classifications until a best classification fit for the page image is found. If no classification fit is found in decision block 904, the subroutine 900 proceeds to decision block 906 where a determination is made about whether the SP criteria 204 have been applied for the same page image classification a threshold number of times. If so, the subroutine 900 proceeds to block 908 where a human operator manually assigns a preliminary classification to the page and the subroutine 900 proceeds to block 910. Alternatively, if no classification fit is found in decision block 904, the page images from the entire document being classified are manually classified by a human operator in block 908 and subroutine 900 is terminated. If the threshold has not been exhausted, the subroutine 900 returns to block 902 wherein the SP criteria 204 are again applied to the page image for the same page image classification possibly with new or additional page image data and/or new or additional SP criteria 204. In one embodiment, blocks 906 and 908 are implemented if the classification process comprises the first phase only, namely, classification based on the SP criteria 204. In another embodiment, blocks 906 and 908 are performed only during the second phase of the classification, described with respect to FIG. 10 below. Yet in another embodiment, blocks 906 and 908 are performed in all phases of the classification process, for example, for testing purposes or for increasing quality of resulting classifications. If at decision block 904 a classification fit has been identified for the page image, the routine 900 proceeds to block 910 where the preliminary classification is recorded for the page image. At block 912 the global page data is updated. As noted above, the global page data may be combined with the MP criteria 208 and applied to the page in a second phase of classification by the MP classifier 206. The global page data may include aggregate information collected from all page images in the source as a whole. In one embodiment, the MP criteria 208 include, but are not limited to, page location information, dynamic keywords, title keywords, sentence structure, previous page, digit density, and word density, as discussed above with respect to FIG. 4. Subroutine 900 terminates at block 914. The first phase of the classification process described in FIG. 8 is thus completed.

Figure 10:
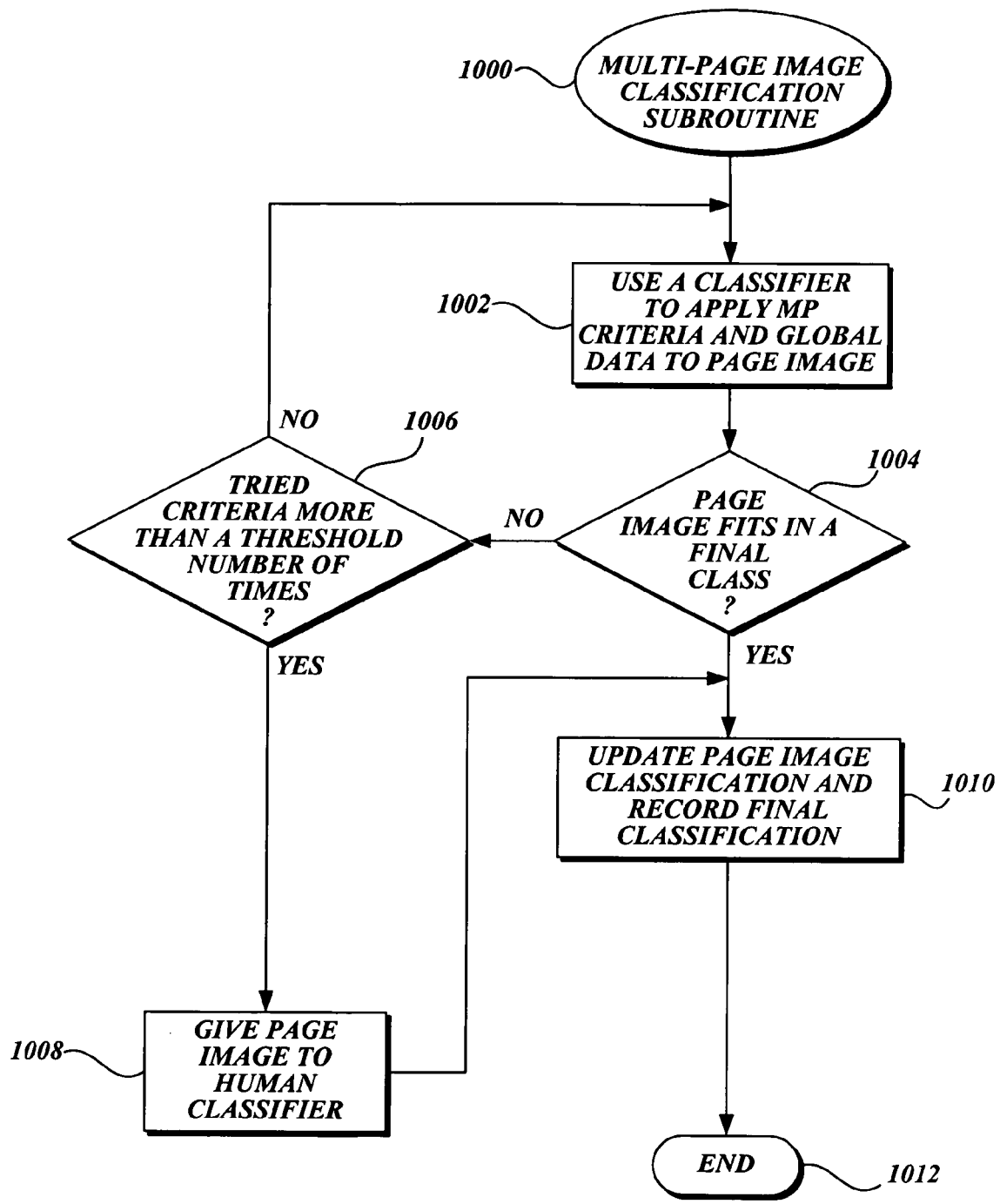
FIG. 10 is a flow diagram showing a sample method for multiple-page image classification referenced in the flow diagram of FIG. 8.

A second phase of the classification process starts with subroutine 1000 wherein the MP criteria 208 are applied to the page image. FIG. 10 is a flow diagram showing a sample method for multiple-page classification referenced in the flow diagram of FIG. 8. The subroutine 1000 proceeds to block 1002 wherein a classifier is used to apply the MP criteria 208 to the page image. In one embodiment, the criteria are applied to one page image at a time and for one classification at a time. Subroutine 1000 may use a linear combinator classifier or other classifiers, such as a Bayesian classifier, to apply the MP criteria 208 in block 1002. The subroutine 1000 applies the MP criteria 208 for different page image classifications until a best classification fit for the page image is found. If no classification fit is found in decision block 1004, the subroutine 1000 proceeds to decision block 1006 where a determination is made about whether the MP criteria 208 have been applied for the same page image classification a threshold number of times. If so, the subroutine 1000 proceeds to block 1008 where a human operator manually assigns a final classification to the page image and the subroutine 1000 proceeds to block 1010. Alternatively, if no classification fit is found in decision block 1004, the page images from the entire document being classified are manually classified by a human operator in block 1008 and subroutine 1000. If the threshold has not been exhausted, the subroutine 1000 returns to block 1002 wherein the MP criteria 208 are again applied to the page image for the same page image classification, possibly with new or additional page image data and/or new or additional MP criteria 208. If at decision block 1004 a classification fit has been identified for the page image, the routine 1000 proceeds to block 1010 where the final classification is recorded for the page image. The subroutine 1000 terminates at block 1012, thus completing the second phase of the classification process depicted in FIG. 8.

Figure 11:
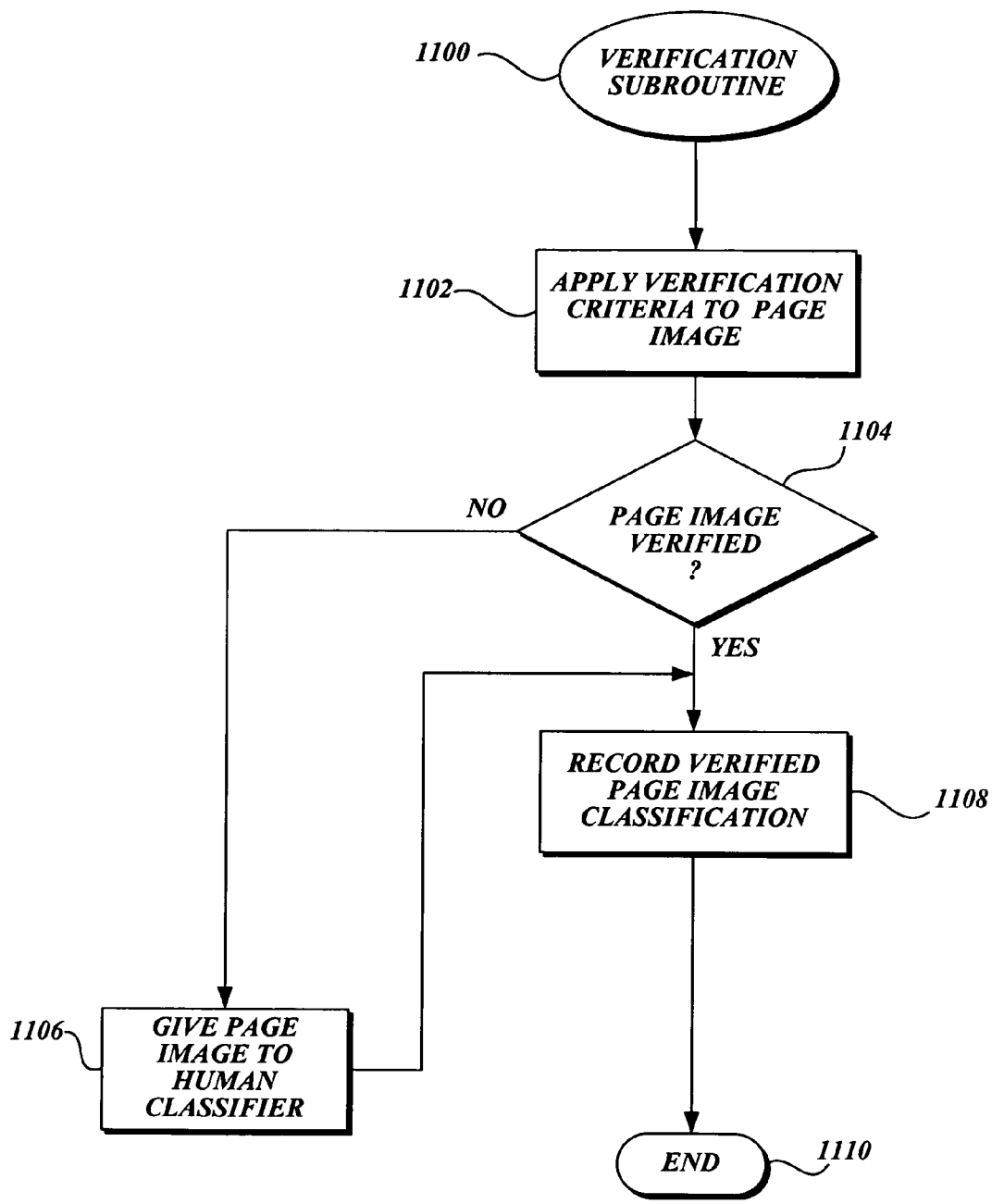
FIG. 11 is a flow diagram showing a sample method for optional verification of page image classification referenced in the flow diagram of FIG. 8.

The final phase of the classification process, which is optional, is the verification phase. As discussed above, the verification phase is used a final step to increase the probability of a correct page image classification. FIG. 11 is a flow diagram showing a sample method for optional verification of page image classification referenced in the flow diagram of FIG. 8. The subroutine 1100 proceeds to block 1102 wherein a classifier is used to apply the verification criteria 218 to the page. In one embodiment, the criteria are applied to one page image at a time and for one classification at a time. Subroutine 1100 may use a linear combinator classifier or other classifiers, such as a Bayesian classifier, to apply the verification criteria 218 in block 1102. The subroutine 1100 applies the verification criteria 218 for the page image classification to determine the validity of the final classification determined by the routine 1000. If the final classification is rejected in decision block 1104, the subroutine 1100 proceeds to block 1106 where a human operator manually assigns a final classification to the page image and the subroutine 1000 proceeds to block 1108. If at block 1104 the final classification for the page is verified, the routine 1100 terminates at block 1110, thus completing the optional third and final phase of the classification process depicted in FIG. 8.

While sample embodiments have been illustrated and described, it will be appreciated that various changes can be made therein without departing from the spirit and scope of this disclosure. For example, although three phases of classification are described herein, i.e., SP, MP, and verification, those skilled in the relevant art will recognize that any one of these phases may be eliminated or modified and that additional phases or classification methods may be used. In addition, the output of any classifier or verifier may be stored in a variety of formats. For example, the classification for each page image may simply be stored in a text file. In another embodiment, the page image may be annotated with the classification in the form of, e.g., bookmarks.

The scope of the present invention should thus be determined, not from the specific examples described herein, but from the following claims and equivalents thereto.

What is claimed is:

1. A system for classifying a page represented by a page image from a serially organized source, comprising:
    a processor configured to execute program instructions that:
        analyze a page image with a first classifier that automatically determines a first classification of the page represented by the page image that includes content from the serially organized source upon successful application of a first set of criteria,
            wherein the first set of criteria is based at least in part on the content in the page image being classified and is independent of content in other page images from the source; and
        analyze the page image with a second classifier that automatically determines a second classification of the page based at least in part on the determined first classification and on a second set of criteria,
            wherein the second set of criteria comprises: a location of the page-represented by the page image relative to a location of multiple page images in the source, content in multiple page images from the source, and global page data obtained by the first classifier;
        wherein the page image is classified as comprising at least one of a front cover page, a front face page, a front matter page, a copyright page, a table of contents page, an index page, or a back cover page.

2. The system of claim 1, wherein the processor is configured to store page data in a database, wherein the page data are related to the content of the page whose page image is being classified by the classifier.

3. The system of claim 2, wherein at least one of the first classifier or the second classifier is a linear combinator.

4. The system of claim 3, wherein the linear combinator automatically classifies the page based on the criteria stored in the database and at least one weighted coefficient.

5. The system of claim 1, wherein the criteria include dynamic information that is determined during the analysis of the page image.

6. The system of claim 1, wherein the criteria include static information that is determined before the analysis of the page image.

7. The system of claim 1, wherein at least one of the first classifier or the second classifier is a Bayesian classifier.

8. The system of claim 1, wherein the processor is further configured to verify a classification of the page provided by at least one of the first classifier and the second classifier.

9. A system for classifying a type of page that is represented by a page image, comprising:
    a processor configured to execute program instructions that provide:
        a first page image classifier that automatically determines a first classification for a page represented by a page image that includes content from a serially organized source upon successful application of a first set of criteria,
            wherein the first set of criteria is based at least in part on the content in the page image being classified and is independent of content in other page images from the serially organized source;
        a second page image classifier that automatically determines a second classification for the page using the first classification of the page determined by the first page image classifier and using a second set of criteria,
            wherein the second set of criteria is based at least in part on: content in multiple page images from the serially organized source, a location of the page relative to a location of the multiple page images in the serially organized source, and global page data obtained by the first image classifier; and
        a verifier that receives the second classification and uses verification criteria to confirm the second classification of the page.

10. A computer-implemented method of classifying a page represented by a page image of content from a serially organized source, comprising:
    applying, with a computer, criteria for a first classification to a page image of a page of content from the serially organized source to determine a first classification score for the page, wherein the criteria for the first classification are based on the content in the page image being classified and are independent of content in other page images from the serially organized source;
    comparing, with the computer, the first classification score for the page to a first classification threshold;
    if the first classification score satisfies the first classification threshold, automatically assigning, with the computer, the first classification to the page;
    applying, with the computer, criteria for a second classification to the page image to determine a second classification score for the page,
        wherein the criteria for the second classification includes: the first classification, global page data determined based at least in part on content in multiple page images from the serially organized source, and a location of the page relative to a location of the multiple page images in the serially organized source;
    comparing, with the computer, the second classification score for the page to a second classification threshold; and
    if the second classification score satisfies the second classification threshold, automatically assigning, with the computer, the second classification to the page.

11. The computer-implemented method of claim 10, further comprising:
    if the first classification score does not satisfy the threshold,
    applying, with the computer, criteria for an $n^{th}$ classification to the image of the page to determine an $n^{th}$ classification score for the page;
    comparing, with the computer, the $n^{th}$ classification score for the page to the threshold; and
    if the $n^{th}$ classification score satisfies the threshold, automatically assigning, with the computer, the nth classification to the page.

12. The computer-implemented method of claim 10, wherein the criteria for the first classification are related to the content of the page.

13. The computer-implemented method of claim 10, wherein weights are applied to the criteria for the first and second classification.

14. The computer-implemented method of claim 10, wherein the first and second classification criteria include at least one of static information or dynamic information.

15. A non-transitory computer-readable medium having instructions encoded thereon that, in response to execution by a computing device, cause the computing device to:
apply first classification criteria to a page image of a page of content from a serially organized source, wherein the first classification criteria are related to content in the page image and are independent of content in other page images from the source;
automatically assign a first classification to the page upon successful application of the first classification criteria to the page image;
store the first classification of the page;
apply second classification criteria to the page image, wherein the second classification criteria include the first classification of the page, the content in the page image, a location of the page represented by the page image relative to a location of multiple page images in the serially organized source, and global page data related to the content of the serially organized source as a whole;
automatically assign a second classification to the page upon successful application of the second classification criteria to the page image; and
store the second classification of the page.

16. The non-transitory computer-readable medium of claim 15, wherein the second classification criteria are further related to the content in other page images of the serially organized source.

17. The non-transitory computer-readable medium of claim 15, wherein the first and second classification criteria include dynamic information.

18. The non-transitory computer-readable medium of claim 15, wherein the first and second classification criteria include static information.

19. The non-transitory computer-readable medium of claim 15, wherein the first and second classification of the page is at least one of a front cover, front face, front matter, copyright page, table of contents, text, index, back matter, and back cover.

20. The non-transitory computer-readable medium of claim 15, wherein the instructions encoded thereon, in response to execution by the computing device, further cause the computing device to apply third classification criteria to the page image to verify the second classification of the page, wherein the third classification criteria includes the second classification and at least a portion of the first classification criteria and the second classification criteria.

* * * * *